Figure 1:
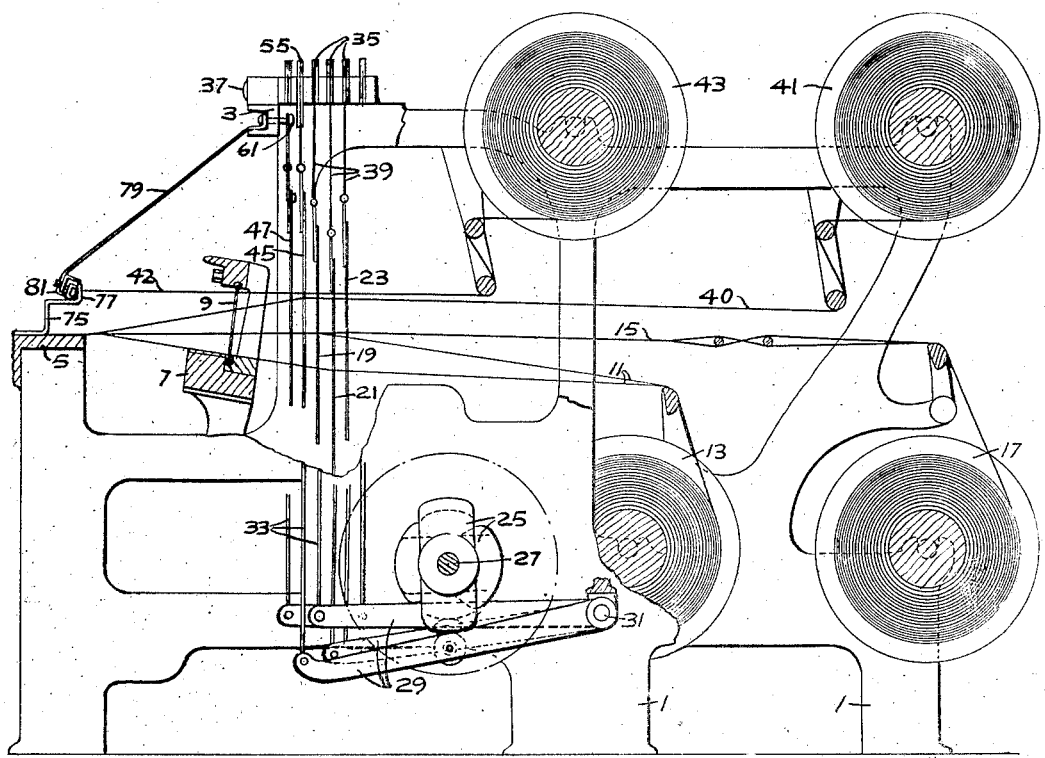

V. P. THEWLIS, D. G. MELVILLE AND R. A. TAYLOR.
LOOM.
APPLICATION FILED SEPT. 11, 1919.

1,358,039.

Patented Nov. 9, 1920.
3 SHEETS—SHEET 1.

Inventors.
Victor P. Thewlis
David G. Melville
Robert A. Taylor
by Robt. P. Hains
Attorney

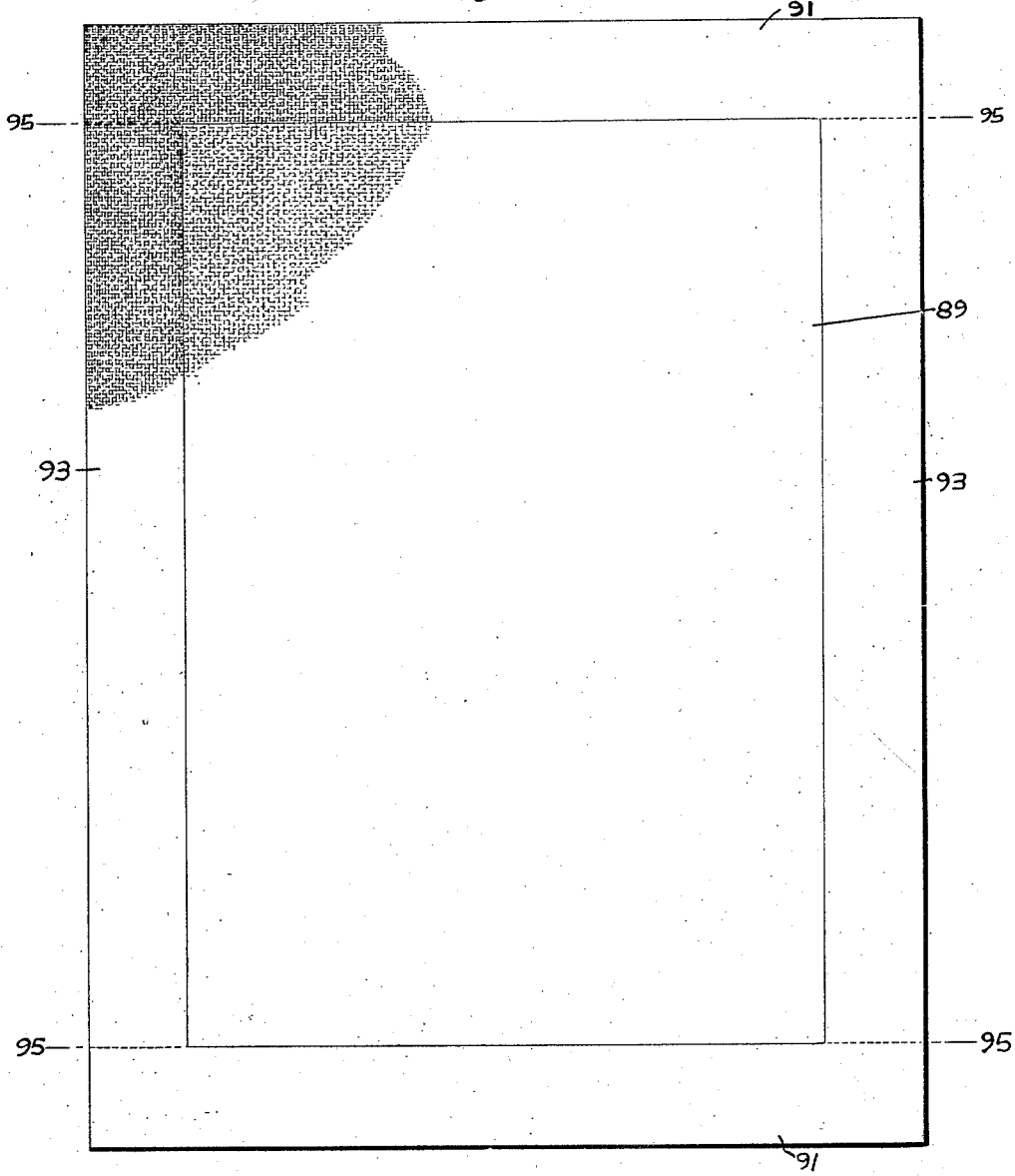

UNITED STATES PATENT OFFICE.

VICTOR P. THEWLIS, OF BROOKLINE, DAVID G. MELVILLE, OF MEDFORD, AND ROBERT A. TAYLOR, OF SAXONVILLE, MASSACHUSETTS, ASSIGNORS TO ROXBURY CARPET COMPANY, OF BOSTON, MASSACHUSETTS, A CORPORATION OF MASSACHUSETTS.

LOOM.

1,358,039.    Specification of Letters Patent.    Patented Nov. 9, 1920.

Application filed September 11, 1919. Serial No. 323,202.

*To all whom it may concern:*

Be it known that we, VICTOR P. THEWLIS, a subject of the King of Great Britain, DAVID G. MELVILLE, a citizen of the United States, and ROBERT A. TAYLOR, a citizen of the United States, residing at Brookline, county of Norfolk, Medford, county of Middlesex, and Saxonville, county of Middlesex, respectively, and State of Massachusetts, have invented an Improvement in Looms, of which the following description, in connection with the accompanying drawings, is a specification, like characters on the drawings representing like parts.

The invention to be hereinafter described relates to looms and more particularly to a loom for making a rug in accordance with the method disclosed in our copending application Serial No. 320,810, filed August 30, 1919.

Heretofore in weaving rugs having a body of one color and a border of a different color, it has been the practice to print warps forming the surface of the cloth, a color for a distance corresponding to the length of the body of the rug, and to print the warps a different color for distances corresponding to the width of the end borders of the rug. That is, continuous warps have been used in the production of the body and borders of the rug.

It has been found impossible to gage the printing so as accurately to produce a sharply defined design, since there are disturbing factors, such as the take-up, the length of the warps, variations in tension, etc., which prevent the points on the warps, where the change occurs from the color for the body to the color for the end border, from lying on the same straight line. As a consequence, the line of juncture of the body with the border has been irregular and indefinite.

One of the purposes of the present invention, therefore, is to provide a loom for producing a rug or fabric which will have a clear cut line of juncture between portions thereof, such, for example, as between the body and border of the rug or fabric. In carrying this purpose into practical effect, certain warps are used for the body and separate and independent warps are used for the end borders, the former being supplied by one beam, and the latter being supplied by another beam. These warps are progressively engaged in the weaving operation, the body warps being idle while the border warps are active, and vice versa. By the use of separate warps for the body and end borders, the change from warps of one color to warps of another color may occur on a sharply defined straight line, thereby resulting in a rug having an appearance much improved over that of rugs produced by the warp printing method referred to.

Also, by the loom embodying the invention, since one warp beam supplies the body warps and another warp beam supplies the border warps, rugs of greater length, or a greater number of rugs than heretofore possible can be woven without change of warp beams.

Figure 2:
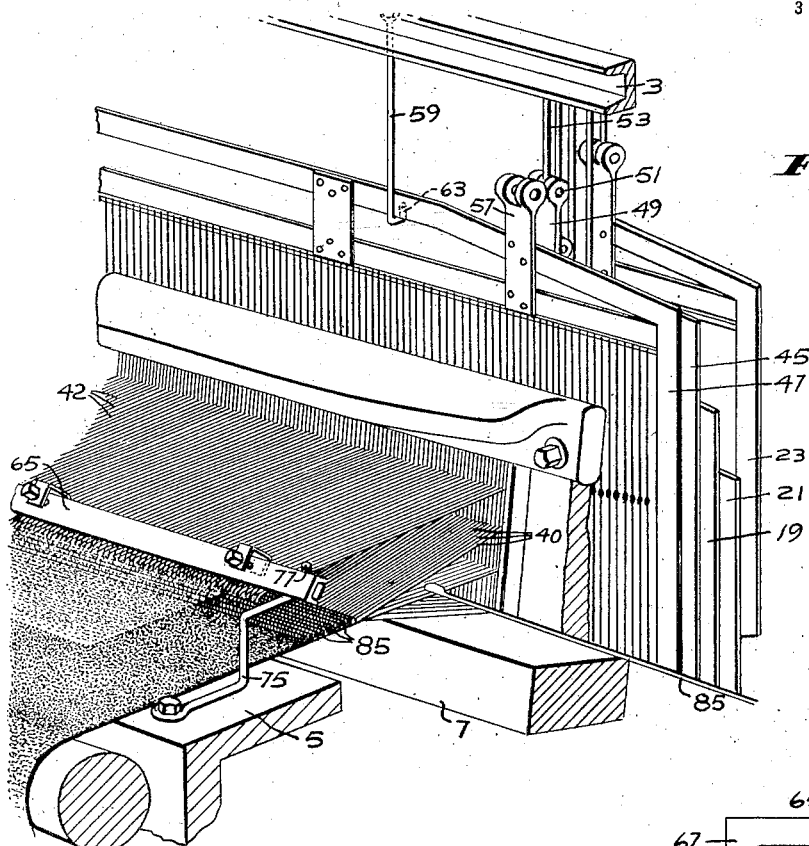
Figure 4:
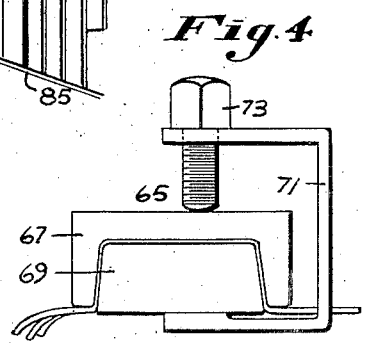
Figure 3:
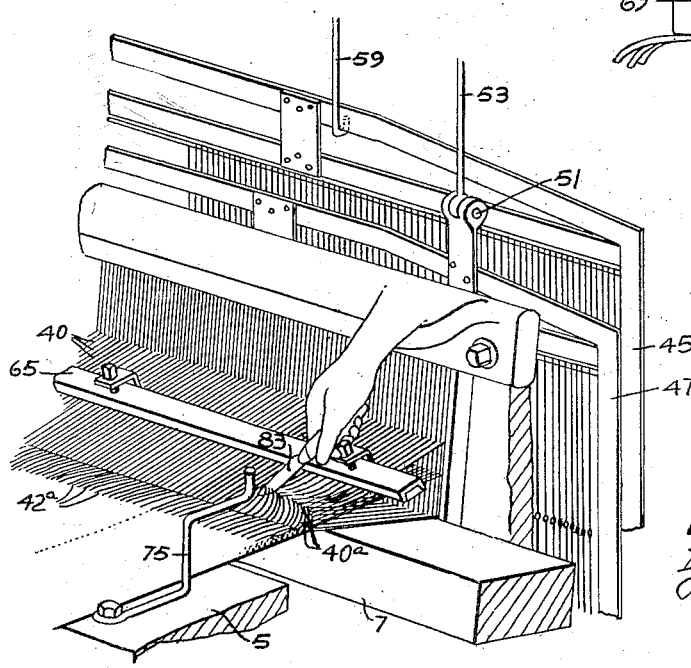

The character of the invention may be best understood by reference to the following description of one good form of loom embodying the invention shown in the accompanying drawings, wherein:

Figure 1 is a view partly in side elevation and partly in section showing so much of a loom as is necessary to illustrate the invention;

Fig. 2 on an enlarged scale is a perspective view of a portion of the loom shown in Fig. 1;

Fig. 3 is a perspective view of parts appearing in Fig. 2, but in a different position;

Fig. 4 on an enlarged scale is an end view of a clamping device for holding the ends of one set of warps when idle; and Fig. 5 is a plan of a rug which may be produced by the loom.

Looms for producing various weaves may be employed in the practice of the method, but for purposes of illustration, a loom is shown herein for weaving warp pile fabrics.

This loom comprises side frames 1 held in spaced relation by suitable girts. Mounted on said side frames are the arch beam 3 and breast beam 5. The lay 7 having the reed 9 is constructed and operated as usual.

The warps 11 for the ground or foundation of the fabric are supplied by a warp beam 13, and the wadding or stuffing warps 15 are supplied by the warp beam 17. Harnesses 19 and 21 are provided for the ground or foundation warps, and a harness 23 is provided for the wadding or stuffing warps. These harnesses may be raised or lowered by cams 25 on a cam shaft 27 and cooperating with treadles 29 fulcrumed on a shaft 31, said treadles being connected by rods 33 with rock levers 35 on a shaft 37 supported on the arch beam 3 referred to, said levers in turn being connected by rods 39 with the harnesses. Since the cams, harnesses and the operating connections between them may be of usual construction, it is unnecessary to show and describe the same in detail herein. The construction is such that the ground warps and wadding warps are raised and lowered to perform the shedding operation in the usual manner for the production of the ground fabric for a warp pile weave.

Heretofore, in weaving warp pile rugs having body warps of one color and border warps of a different color, the warps have been printed appropriately for the body and end borders, continuous warps being used, supplied from one warp beam or a plurality of warp beams mounted on the same shaft, and carried through from end to end of the rug. As stated, in accordance with the present method, however, one set of warps is used for weaving the body, and separate and independent warps are used in weaving the end borders of the rug, the border warps being idle while the body warps are active, and vice versa.

To supply the body pile warps 40, a warp beam 41 may be mounted on the side frames of the loom, and to supply the border pile warps 42, a warp beam 43 may be mounted on the side frames of the loom conveniently above the ground warp beam 13 and wadding warp beam 17 referred to. A harness 45 may be provided for the body warps, and a harness 47 may be provided for the border warps. The harness 45 and 47 are alternately active in the weaving operation, and the same cam and connections may be employed to raise and lower said harnesses. Suitable means may be provided detachably to connect the harness 45 and 47 to the operating mechanism therefor. To accomplish this, in the present instance, the harness 45 is provided with a pair of straps 49 adjacent opposite ends thereof adapted to be connected by screw bolts 51 with rods 53 depending from the rock levers 55 of said operating mechanism.

Similarly, the harness 47 may be provided with a pair of straps 57 adjacent the opposite ends thereof adapted to be connected by the bolts 51 to the rods 53 when the harness 47 is to be active in the weaving operation instead of the harness 45.

Suitable means may be provided to support the body and border harnesses when they are inactive. To accomplish this, in the present instance, a pair of hangers 59 are provided depending from bolts 61 secured to the arch beam 3 referred to, said hangers being provided with hooks 63 at the lower ends thereof adapted to engage the upper frame members of the harnesses and support the same.

Suitable means may be provided to hold the ends of the body and border pile warps when they are inactive. To accomplish this, in the present instance of the invention, a clamping device 65 may be provided comprising a channel 67 (Fig. 4) and a bar 69 adapted to fit into said channel and be held therein by a series of U-shaped clamps 71 provided with screw bolts 73. To secure the clamping device to the warps, the channel and bar may be presented at the opposite sides of the warps, and the bar 69 may be pressed into the channel. Then the U-shaped clamps 71 may be applied and secured by tightening the screws 73, thereby securely gripping the warps between said channel and bar.

Suitable means may be provided to support the clamping device in position to hold the idle warps a sufficient distance above the cloth to avoid interference with the weaving operation and lay movements. To accomplish this, in the present instance, a pair of brackets 75 are mounted on the breast beam 5 and provided with upturned ends 77. To contribute to the support of the clamping device, an incline bar 79 may be provided intermediate the bracket 75, and have its upper end secured to the arch beam 3. The lower end of the bar 79 may have a hook 81 to receive the clamping device.

In Fig. 2 the loom is shown in condition for weaving the body of the rug. The ends of the border warps are secured to the clamping device 65 supported by the brackets 75 in a position such that the border warps are held a substantial distance above the cloth, and the harness 47 for the border warps is supported in inoperative position by the hangers 59. The harness 45 for the body warps is connected to the cam operated mechanism, and is active in the weaving operation.

With the parts of the loom in this condition, the weaving continues until a body of the length desired is completed. Thereupon, the body pile warps should be cut out, and the border warps should be introduced. To accomplish this, the harness 45 for the body pile warps is disconnected from the shedding mechanism and supported on the hangers 59, and the harness 47 for the border pile warps is lifted from the hangers and connected to the shedding mechanism, which was formerly connected to the harness 45.

Then the clamping device is lifted from the brackets 75 and the hook of the inclined bar 79 and lowered down to the cloth, thereby superposing the border warps on the cloth with the ends 42ª (Fig. 3) thereof projecting, for example, two or three inches frontward beyond the fell of the cloth. The loom may then be operated to throw one or two picks to secure the border warps to the cloth. After this has been done, the clamping device is secured to the body warps a substantial distance from the fell of the cloth, as will be noted in Fig. 3. Then the body warps may be severed by a knife 83 or other suitable instrument along a line between the clamping device and the fell of the cloth, the loose end portions 40ª of the warps projecting from the cloth being turned over onto the cloth. The clamping device may then be raised, brought forward and placed upon the brackets 75 back of the upstanding ends thereof, and seated in the hook 81 of the inclined bar 79. The loom may then be started and several picks thrown to commence weaving the border warps. Then the loose ends of the body and border warps may be cut off close to the cloth manually by scissors. The weaving of the end border may then continue until completed.

The change from border to body warps may be made in a manner similar to that already described, it being understood, of course, that the body warps are substituted for the border warps.

If a cut pile fabric is to be produced, the usual rods 85 may be employed, provided with knives and operated by mechanism well understood in the art, and therefore, unnecessary to show and describe herein.

It will be understood that the pile warps for the production of the side borders of the rug will be supplied by the same beam which supplies the body warps, but, of course, will be of a different color.

Referring to Fig. 5, the rug shown therein is made in accordance with the method embodying the invention, and comprises a body 89, end borders 91 and side borders 93, the end borders meeting the body and side borders on lines indicated by the dotted lines 95—95.

By the aforesaid loom, the change from body pile warps to border pile warps may be quickly and readily made, and since the body and border warps are separate and independent, the change from one to the other will occur on the sharply defined straight lines 95—95, and a rug will be produced which is much superior to the rug made by the warp printing method as hitherto practised. After the weaving of the rug has been completed as described, the rug may be put through the usual shearing machine, which completely eliminates the appearance of lines of juncture between the end borders and side borders of the rug.

While the loom has been described more particularly with reference to the weaving of the body and borders of a rug, it will be understood that the separate and independent surface pile warps may be successively brought into play for the production of transverse stripes with a well defined straight line of juncture between them, or for the production of other designs within the scope of the invention.

What is claimed is:—

1. In a loom for weaving rugs having a body and end borders, the combination of a warp beam for body warps, a warp beam for border warps, a harness for the body warps, a harness for the border warps, shedding mechanism, means for alternatively shedding the body and border warps, means idly to support one of said harnesses while the other is active in the shedding operation, means to hold the body warp ends adjacent the fell of the cloth while the border warp harness is active and to hold the border warp ends adjacent the fell of the cloth while the body warp harness is active.

2. In a loom, the combination of harnesses, one for one set of warps and the other for another set of warps, shedding mechanism, means alternatively to connect said harnesses to said mechanism, means idly to support either of said harnesses, and means idly to hold the ends of either set of said warps in stationary position adjacent the fell of the cloth ready to be introduced into the weaving operation while the other set of warps is active in the weaving operation.

3. In a loom, the combination of a frame, a pair of harnesses, one for one set of warps and the other for another set of warps, shedding mechanism, means alternatively to connect said harnesses to said mechanism, means mounted on said frame idly to support either of said harnesses, and a clamp device for holding the ends of either set of said warps while the other set of warps is active in the weaving operation.

4. In a loom for weaving warp pile fabrics, the combination of harnesses for the ground warps of the fabric, harnesses for different sets of pile warps, shedding mechanism for said harnesses, means detachably to connect either of said pile warp harnesses to the shedding mechanism that either set of pile warps may be woven, means idly to sustain either of said warp pile harnesses while the other is active in the weaving operation, a clamp for holding the ends of the inactive pile warps adjacent the fell of the cloth.

5. In a loom for weaving pile fabrics, the combination of independent harnesses for body pile warps and end border pile warps, shedding mechanism, means alternatively to connect either of said harnesses to said mechanism, means mounted in fixed position to support either of said harnesses, a clamp for clamping the cut ends of the body pile warps or the end border pile warps, and a support for the clamp secured to the loom frame constructed and arranged to hold the clamp and the ends of the inactive pile warp threads adjacent the fell of the cloth ready to be introduced into the weaving operation.

6. In a loom, the combination of a frame having a breast beam and an arch beam, a pair of harnesses for different sets of warps, shedding mechanism, means alternatively to connect said harnesses to said mechanism that said sets of warps may be alternatively woven, hanger means connected to said arch beam for idly sustaining either of said harnesses while the other is active, supporting means on said breast beam, and a device mounted on said supporting means for holding the ends of either set of said warps while the other set of warps is being woven.

7. In a loom, the combination of means to supply different sets of surface warps, means alternatively to weave said sets of warps into the cloth, a clamp adapted for manual application to the ends of the inactive set of said warps and means to hold the clamped ends of the inactive surface warps in position adjacent the fell of the cloth ready to be woven, while the other set of warps is active in the weaving operation.

8. In a loom for weaving pile warp fabrics, the combination of means for supplying different sets of pile warps, harnesses for said different sets of warps, respectively, shedding mechanism, means to connect either of said harnesses to the shedding mechanism to weave first one set of warps and then the other set of warps into the cloth, a clamp for holding the ends of either set of said pile warps adjacent the fell of the cloth after they have been cut, and means for supporting the clamp adjacent to the fell of the cloth.

9. In a loom for weaving warp pile fabrics, the combination of means to supply different sets of pile warps, harnesses for said different sets of warps, respectively, shedding mechanism, means to connect either of said harnesses to the shedding mechanism to weave first one set of warps and then the other set of warps into the cloth, and a device for holding the ends of either set of said warps adjacent the fell of the cloth after being severed adjacent the cloth and cut out of the weaving operation.

10. In a loom for weaving warp pile fabrics, the combination of means for weaving one set of pile warps into the cloth, and holding means for sustaining the ends of another set of pile warps adjacent the fell of the cloth and in readiness to be woven, said holding means being transferable to the first set of warps after connection of the second set of warps to the fell of the cloth, in order to sustain the first set of warps while the second set of warps is being woven.

11. In a loom for weaving warp pile rugs, the combination of a beam for supplying the body and side border warps of the rug, a beam for supplying the end border warps of the rug, a harness for the body and side border warps, a harness for the end border warps, shedding mechanism, means alternatively to connect said harnesses to the shedding mechanism, that either the body and side border warps or the end border warps may be woven at will, and holding means adjacent the fell of the cloth alternatively to sustain the ends of the body and side border warps or the end border warps in fixed position near the fell of the cloth ready for weaving.

In testimony whereof, we have signed our names to this specification.

VICTOR P. THEWLIS.
DAVID G. MELVILLE.
ROBERT A. TAYLOR.